United States Patent [19]

de Bruijn

[11] 4,380,282
[45] Apr. 19, 1983

[54] CABLE SUSPENDED CONVEYOR

[75] Inventor: Hans de Bruijn, Lancaster, Pa.

[73] Assignee: Aggregates Equipment, Inc., Leola, Pa.

[21] Appl. No.: 243,459

[22] Filed: Mar. 13, 1981

[51] Int. Cl.³ ............................................. B65G 21/10
[52] U.S. Cl. .................................... 198/318; 198/317
[58] Field of Search ............... 198/317, 318, 508, 863, 198/865; 414/133

[56] References Cited

U.S. PATENT DOCUMENTS

| | | | |
|---|---|---|---|
| 1,216,603 | 2/1917 | Phillips | 414/133 |
| 1,732,083 | 10/1929 | Coppock | 198/317 X |
| 3,472,357 | 7/1969 | Strocker | 198/508 |
| 3,552,546 | 1/1971 | Rath | 198/318 X |
| 3,586,152 | 6/1971 | Austin et al. | 198/508 |
| 4,172,518 | 10/1979 | Grayson | 198/508 |

FOREIGN PATENT DOCUMENTS 748833  7/1933  France ............................ 414/133

*Primary Examiner*—Joseph E. Valenza
*Assistant Examiner*—Dennis Williamson
*Attorney, Agent, or Firm*—Martin Fruitman

[57] ABSTRACT

A stacker for moving stone or other such material to the top of a pile by use of an endless belt conveyor. A long section of conveyor is rigged with converging suspension cables along its length to enable lifting the conveyor from a single point. With one end anchored and lifting near the center, the conveyor loading simulates static conditions as the other end is lifted above the discharge point. The central lift point is located at the top of a single mast which is leaned toward the anchored end of the conveyor. The combination of the angled mast and suspended conveyor section results in vector forces which give the assembly superior balance and stability and yields a conveyor support structure which is less costly and much lighter than previous designs.

10 Claims, 4 Drawing Figures

CABLE SUSPENDED CONVEYOR

SUMMARY OF THE INVENTION

This invention deals generally with power driven conveyors and more specifically with such conveyors which have means to form a pile of bulk material.

A stacker is a particular type of power driven conveyor in which one end of a conveyor is anchored close to the ground and the other end is lifted to various heights to permit moving of aggregate material above the top of a pile. When such a stacker is movable around its anchor point to permit the formation of an arcuate stack around the anchor point, which is also used to load the stacker, such a device is termed a radial stacker.

The well established type of construction for radial stackers is depicted in U.S. Pat. No. 4,172,518 where an endless conveyor is mounted above a heavily reinforced support truss and raised by means of complex pulleys anchored at several points along the support truss. The pulleys themselves are mounted atop a heavily reinforced mast which rises vertically from a wheeled truck which operates to move the system around the pivot point.

The essential difficulty with this prior art construction is that the combination of pulleys and hoisting cables running back to winches near the pivot point causes diverse and changing forces on the various suspension points along the conveyor support truss, along with multiplication of some forces due to multiple line pulleys. This necessitates a heavily reinforced truss. In fact, the combination of lifting and load forces are so complex that they can cause bowing of the conveyor between suspension points and depending upon the specific conditions this bowing can be either upward or downward. To combat ths problem, the prior approach has been to use heavier and heavier reinforcing which, as the conveyor lengths increase, makes the stacker extremely heavy and costly. There has, in fact, been a practical conveyor length limit of approximately 200 feet, beyond which stackers are rarely built.

The present invention uses a completely different principal of construction from that of the prior art, and thereby dramatically reduces the weight, complexity and cost of stackers. The present invention involves a cable suspended conveyor in which cables attached to various points along the conveyor converge to a common anchor point near the top of a mast. These cables differ from those of the prior art in that all cables have fixed lengths and none have any pulleys. The forces on the cables and at the conveyor support points are, therefore, simple and essentially static.

Instead of with pulleys, lifting of the conveyor is accomplished by the direct lifting of the cables' common anchor point. This can typically be accomplished by a hydraulic piston mechanism or a powered lifting screw which yield virtually unlimited length of stroke. With such a single point lifting arrangement the cable tensions and conveyor support reinforcement requirements are largely dependent upon only the work load predicted and change only in minor aspects with lifting. The only essential change in structural loading is due to changes in vectors due to the changing tilt of the conveyor.

Another important aspect of the present invention is the use of a tilting mast to accommodate to these vector force changes due to different angles of suspension of the conveyor. The tilting mast is also used to maintain the radial force between the stacker pivot point and the truck, or mast base, in a tension mode. Such an accomplishment permits the use of cables instead of beams as radial structural members near the ground, and permits a far lighter and less expensive construction.

More important, the drastic reduction in weight afforded by the combination of pulleyless suspension cables, lightly reinforced conveyor, tilting mast and tension radial members permits the construction of higher and longer radial stackers than have ever before been built.

DETAILED DESCRIPTION OF THE INVENTION

Figure 1:
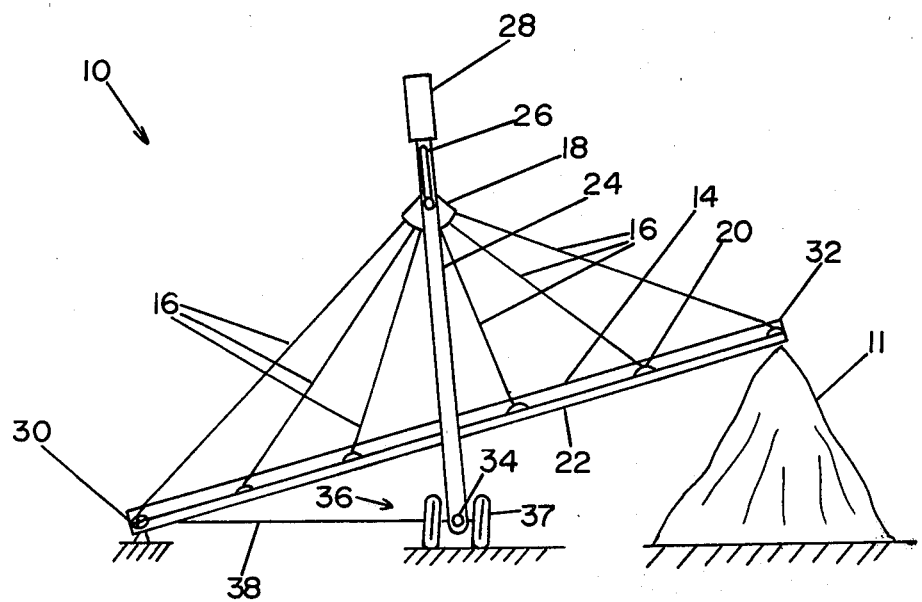
FIG. 1 is a simplified diagram of the preferred embodiment of the invention shown in a lowered conveyor position.
Figure 2:
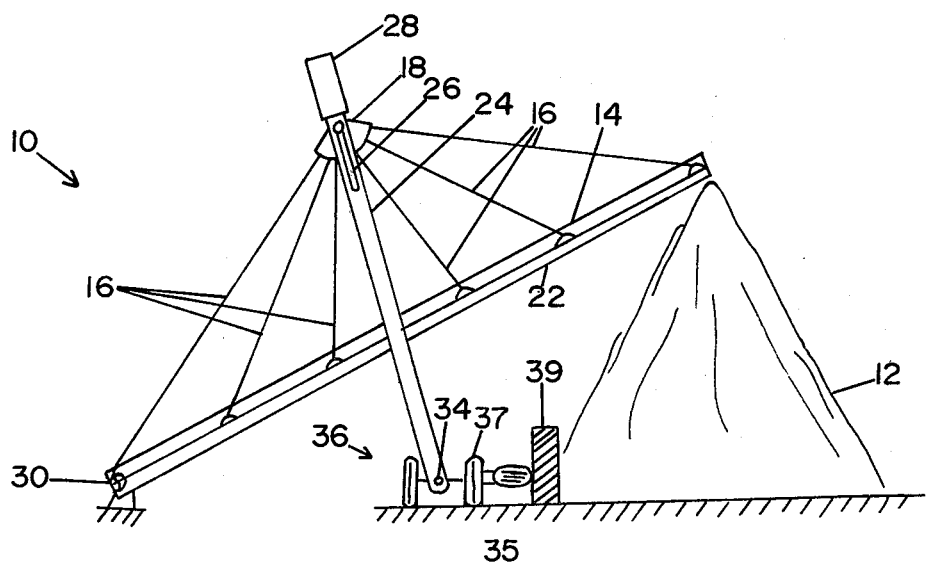
FIG. 2 is a simplified diagram of the preferred embodiment of the invention shown in a raised conveyor position.

The preferred embodiment of the invention is shown in simplified form in FIG. 1 and FIG. 2 where radial stacker 10 is shown at two different elevations to form aggregate piles 11 and 12 of different sizes. Conveyor 14 is supported by cable pairs 16, one cable of each pair attached at each side of conveyor 14. Cables 16 converge at common anchor 18. Cables 16 are attached to conveyor support 22 at anchor points 20 by conventional attachment means such as "U" bolts, and conveyor 14 is itself a conventional conveyor system designed for the anticipated work load, and supported by conveyor support 22 also designed for the normal anticipated work load.

Anchor 18 is installed near the top of and on the center line of mast 24 to which it is movably attached. Guide 26 is use to assure predictable motion of anchor 18 as it is raised or lowered by lifting motor 28.

As motor 28, which can be electrical, pneumatic or some other means of producing motion, is activated to raise anchor 18, the action also lifts conveyor support 22 and conveyor 14. Since conveyor 14 and conveyor support 22 are attached to the ground at vertical and horizontal pivot point 30, the angle of conveyor 14 to the horizontal increases raising its higher end 32, and the vector forces acting in the system cause the top of mast 24 to tilt toward pivot point 30 around mast pivot 34 as shown in FIG. 2.

Mast pivot 34 is mounted upon truck 36 which is independently powered by means (not shown) to move stacker 10 along the ground to give length and arcuate form to aggregate piles 11 and 12. As mast 24 increases its angle to the vertical the increased vector force tending to move mast pivot 34 and truck 36 on wheels 37 away from pivot point 30 is counteracted in FIG. 1 by tension in radial cable 38. Cable 38 is kept in tension at all conditions of operation essentially by keeping mast 24 at some slight angle tilting inward toward pivot point 30 at all times. This concept is shown in FIG. 1, where, with conveyor 14 at its lowest point, mast 24 has a small inward angle.

Another device for applying the radially inward force is shown in FIG. 2, with guide wheel 35 whose movement is restricted by arcuate retaining wall 39 to prevent the base of mast 24 from moving radially outward.

The particular benefit of this configuration of stacker 10 is the dramatic reduction in weight and reinforcing available when most forces are tension forces, and therefore permit cables or thin rods as structural elements as opposed to complex structures such as trusses, which are required to overcome compression forces.

Figure 3:
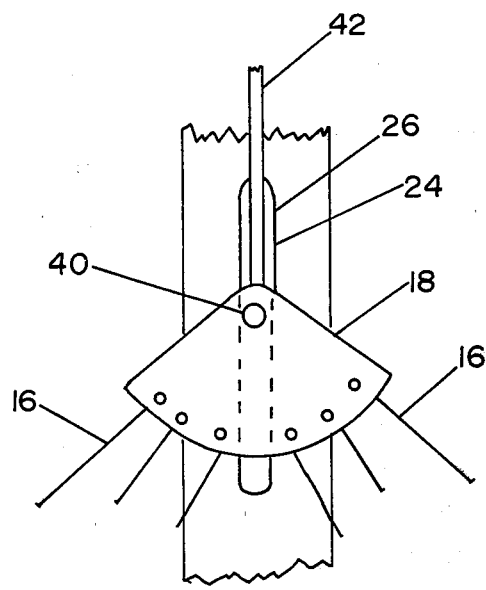
FIG. 3 is a side view of the suspension cable's common anchor means.

FIG. 3 is a side view of a typical cable anchor plate 18 at which cables 16 converge. The fan type construction of anchor plate 18 permits the vector forces on cables 16 to truly converge even if the cables themselves do not. The simple guide system shown consists of slot 26 in mast 24 within which guide pin 40, attached to anchor plate 18, moves. Rod 42 attaches anchor plate 18 to the lifting motor (not shown in FIG. 3) to raise and lower the conveyor.

Figure 4:
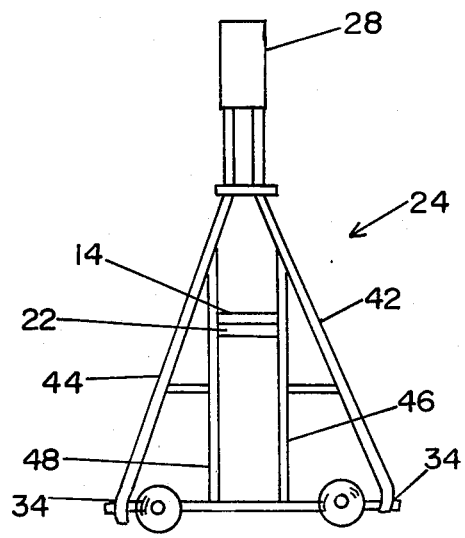
FIG. 4 is a simplified diagram of a preferred embodiment for the support mast of the invention.

FIG. 4 is a simplified diagram of a preferred embodiment of the construction of mast 24 for the radial stacker of FIG. 1 and FIG. 2. The features of mast 24 are "A" frame supports 42 and 44 which furnish lateral support for the entire stacker and conveyor guides 46 and 48 which transmit this lateral support to conveyor support 22 and conveyor 14. Without such lateral restaint conveyor 14 would swing sideways with the slightest wind. Suitable locations of motor 28 and mast pivots 34 upon mast 24 are also shown in FIG. 4.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, other configurations of anchors, guides, motors and masts could be used, and the invention could be used without wheels for a simple stacker without arcuate movement. Moreover, the support structure can also be used with a gravity operated downward conveyor.

For instance, lifting motor 28 could also be located near pivot point 30 and attached to anchor plate 18 by means of a cable with a pulley at the top of mast 24. Also, rod 42 could be replaced with a cable and motor 28 located at the bottom of the mast with the pulley at the top of the mast.

What is claimed as new and desired to be secured by Letters Patent of the United States is:

1. In a stacker for moving aggregate material to and from piles of varying heights wherein a mast located between the ends of a conveyor supports the conveyor at varying angles to the horizontal, the conveyor is anchored at its lower end by a conveyor pivot point, the conveyor is supported from the mast and raised and lowered by cables, and the lower end of the mast is restrained to prevent radial movement relative to the conveyor pivot point, the improvement comprising:
    the mast oriented at an angle to the vertical with its top end leaning in toward the conveyor pivot point and the mast anchored at its lower end at a mast pivot to permit variations in its angle to the vertical;
    the conveyor suspended from the mast by cables of non-varying length, with the vectors of the forces on all the cables converging at a single point and the cables attached to a cable anchor means;
    a cable anchor means located on and movably attached to the mast to permit raising and lowering of the cable anchor means on the mast;
    a motor means attached to the cable anchor means and capable of raising and lowering the cable anchor means on the mast; and
    a radial force means attached near the lower end of the mast to maintain an inward force on the lower end of the mast.

2. The stacker of claim 1 with the further improvement comprising means wherein the mast angle to the vertical increases as the conveyor is raised.

3. The stacker of claim 1 with the further improvement comprising means wherein the lower end of the mast is attached to a vehicle to revolve the mast around the conveyor pivot point and means to maintain radially inward force near the lower end of the mast regardless of mast location.

4. The stacker of claim 1 wherein the cable anchor means is located on and restricted to the center line of the mast.

5. The stacker of claim 1 wherein the mast is constructed in the configuration of an "A" frame.

6. An aggregate material stacker comprising:
    a conveyor means anchored at one end and pivoted in a vertical plane from the anchored end;
    cables supporting the conveyor, each of said cables of fixed length with the vectors of the forces on the cables converging to a single point;
    a cable anchor means to which the cables are attached;
    a mast the lower end of which is pivoted and to which the cable anchor means is movably attached near the upper end, and which is oriented at an angle to the vertical with its upper end tilted toward the anchored end of the conveyor means;
    a mast pivot means to which the mast is anchored and around which the mast pivots in a vertical plane;
    means for maintaining radially inward force on the mast pivot means; and
    motor means attached to the cable anchor means and capable of raising and lowering the cable anchor means, the cables and the conveyor with a load.

7. The aggregate stacker of claim 6 further comprising a vehicle upon which the mast pivot is anchored and a horizontal pivot point to which the anchored end of the conveyor is attached, to permit the mast to revolve around the conveyor's anchored end.

8. The aggregate stacker of claim 6 wherein the mast is constructed in the configuration of an "A" frame.

9. The aggregate stacker of claim 6 wherein the means for maintaining radially inward force on the mast pivot means is a tension cable anchored at the conveyor's anchored end.

10. The aggregate stacker of claim 6 wherein the means for maintaining radially inward force on the mast pivot point comprises a guide wheel whose movement is restricted by an arcuate retaining wall.

* * * * *